US009575941B1

(12) United States Patent
Westbrook et al.

(10) Patent No.: US 9,575,941 B1
(45) Date of Patent: Feb. 21, 2017

(54) DYNAMIC ADJUSTMENT TO CONTENT FOR A DISPLAY DEVICE

(71) Applicant: Google Inc., Mountain View, CA (US)

(72) Inventors: Paul Thaddeus Westbrook, San Jose, CA (US); Andrew Thomas Huang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 326 days.

(21) Appl. No.: 14/043,806

(22) Filed: Oct. 1, 2013

(51) Int. Cl.
G06F 17/22 (2006.01)
G06F 3/048 (2013.01)

(52) U.S. Cl.
CPC ................. G06F 17/2247 (2013.01)

(58) Field of Classification Search
CPC G06F 17/2235; G06F 17/2247; G06F 17/212; G06F 17/30864; G06F 17/24; G06F 17/3089; G06F 17/30896; G06F 17/30905; G06F 17/30893
USPC .................................................. 715/234, 243
See application file for complete search history.

(56) References Cited

U.S. PATENT DOCUMENTS

| 7,627,350 | B2 | 12/2009 | Enns et al. |
| 8,255,873 | B2 | 8/2012 | Lazier et al. |
| 8,386,959 | B2 | 2/2013 | Rohrabaugh et al. |
| 2012/0096344 | A1 | 4/2012 | Ho et al. |
| 2013/0031508 | A1* | 1/2013 | Kodosky ................. G06F 3/041 715/800 |
| 2013/0179771 | A1* | 7/2013 | Dent ..................... G06Q 10/107 715/234 |
| 2013/0204966 | A1* | 8/2013 | Lee ..................... G06Q 30/0243 709/217 |

OTHER PUBLICATIONS

Marcotte, "Fluid Images", A List Apart [online]. Jun. 7, 2011. Retrieved from the Internet: <http://alistapart.com/article/fluid-images> 16 pgs.
"Text-size-adjust", Mozilla Developer Network [online]. May 10, 2013. Retrieved from the Internet: <https://developer.mozilla.org/en-US/docs/Web/CSS/text-size-adjust?redirectlocale=en-US&redirectslug=CSS%2Ftext-size-adjust> 3 pgs.
MailChimp Email Marketing and Email List Manager, "Email on Mobile Devices", MailChimp [online]. First Accessed on Sep. 19, 2013. Retrieved from the Internet: <http://mailchimp.com/resources/research/email-on-mobile-devices/html/> 21 pgs.

(Continued)

Primary Examiner — Scott Baderman
Assistant Examiner — Hassan Mrabi
(74) Attorney, Agent, or Firm — Shumaker & Sieffert, P.A.

(57) ABSTRACT

A computing device is described that identifies an element that specifies content in accordance with a markup language, where an attribute of the element defines a size of at least a portion of the content specified by the element. Prior to rendering the content specified by the element for display at a display device, the computing device modifies, based at least in part on a screen size of the display device, the attribute of the element to adjust the size of the portion of the content specified by the element based on the screen size of the display device. The computing device renders, for display, the content in accordance with the element and the modified attribute.

17 Claims, 5 Drawing Sheets

(56) References Cited

OTHER PUBLICATIONS

Hodgekiss, "Optimizing your email for mobile devices with the @media query", Campaign Monitor [online]. Jun. 16, 2010. Retrieved from the Internet: <http://www.campaignmonitor.com/blog/post/3163/optimizing-your-emails-for-mobile-devices-with-media/> 8 pgs.

Rutter, "Experiments with max-width and images", clagnut [online]. First Accessed on Sep. 19, 2013. Retrieved from the Internet: <http://clagnut.com/sandbox/imagetest3/> 3 pgs.

* cited by examiner

DYNAMIC ADJUSTMENT TO CONTENT FOR A DISPLAY DEVICE

BACKGROUND

There is an ever-increasing demand on computing devices, including mobile computing devices, to output, for display, richer and more complex types of content. Presenting richer and more complex content can present some unique challenges for some computing devices, such as computing devices that utilize a smaller sized screen of a display device.

For example, some computing devices output content, such as an e-mail message or a webpage, for display at a display device, such as a built-in screen or external display. In some instances, an e-mail message or webpage may include richly formatted content (e.g., tagged content conforming to the hypertext markup language ("HTML")) including one or more elements associated with a variety of attributes, such as color, font, alignment, size, and the like. In such cases, an email application or web browser executing on the computing device typically presents a set of email messages or webpages as a scrollable, rendered HTML page. In some instances, a content developer can embed specific attributes within the content (e.g., by way of cascaded style sheets (CSSs), media queries, etc.) of an e-mail message or webpage to cause a rendering engine to produce a rendering of the e-mail message or webpage based on one or more predefined screen layouts that automatically fit the size of the screen at which the rendering is displayed. In some instances, by simply using one or more predefined screen layouts to produce the rendered HTML based e-mail or webpage, some of the content on the rendered HTML based e-mail or webpage may appear unrecognizably small when presented at a smaller sized screen (e.g., of a mobile phone).

SUMMARY

In one example, the disclosure is directed to a method that includes identifying, by a computing device, an element that specifies content in accordance with a markup language, wherein an attribute of the element defines a size of at least a portion of the content specified by the element. The method further includes, prior to rendering the content specified by the element for display at a display device, modifying, by the computing device, based at least in part on a screen size of the display device, the attribute of the element to adjust the size of the portion of the content specified by the element based on the screen size of the display device. The method further includes rendering, by the computing device and for display, the content in accordance with the element.

In another example, the disclosure is directed to a computing device that includes a display device, at least one processor, and at least one module operable by the at least one processor to identify an element that specifies content in accordance with a markup language, wherein an attribute of the element defines a size of at least a portion of the content specified by the element. The at least one module is further operably by the at least one processor to, prior to rendering the content specified by the element for display at the display device, modify, based at least in part on a screen size of the display device, the attribute of the element to adjust the size of the portion of the content specified by the element based on the screen size of the display device. The at least one module is further operably by the at least one processor to, render, for display, the content in accordance with the element.

In another example, the disclosure is directed to a computer-readable storage medium encoded with instructions that, when executed, cause at least one processor of a computing device to identify an element that specifies content in accordance with a markup language, wherein an attribute of the element defines a size of at least a portion of the content specified by the element. The computer-readable storage medium is further encoded with instructions that, when executed, cause the at least one processor of the computing device to, prior to rendering the content specified by the element for display at a display device, modify, based at least in part on a screen size of the display device, the attribute of the element to adjust the size of the portion of the content specified by the element based on the screen size of the display device. The computer-readable storage medium is further encoded with instructions that, when executed, cause the at least one processor of the computing device to render, for display, the content in accordance with the element.

The details of one or more examples are set forth in the accompanying drawings and the description below. Other features, objects, and advantages of the disclosure will be apparent from the description and drawings, and from the claims.

DETAILED DESCRIPTION

Figure 1:
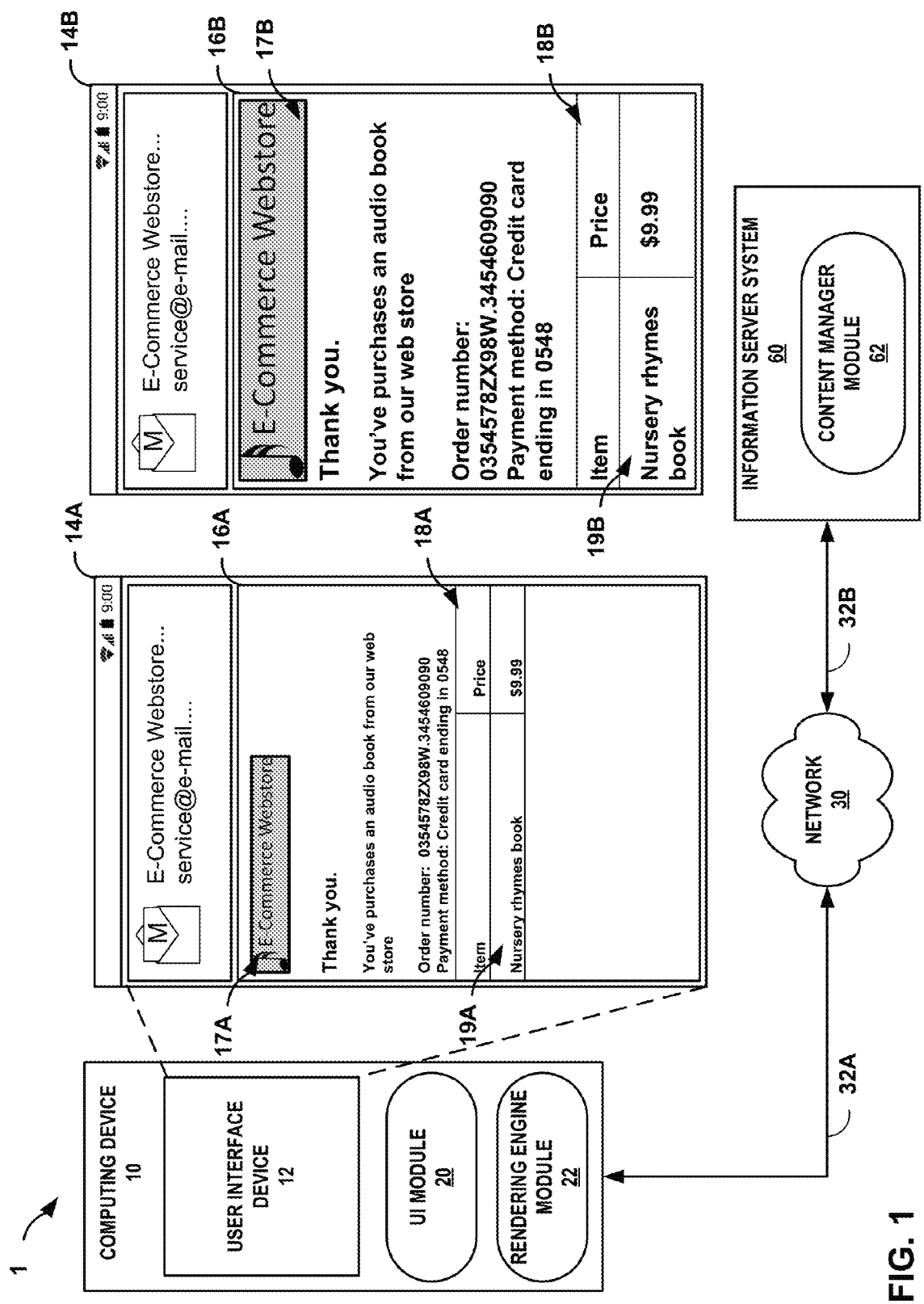
FIG. 1 is a conceptual diagram illustrating an example computing system in which an example computing device is configured to automatically modify content prior to rendering the content for display, in accordance with one or more aspects of the present disclosure.

In general, techniques of this disclosure may enable a computing device to, prior to rendering content for display, dynamically modify the content (e.g., an e-mail message or webpage formatted in accordance with a markup language) based on the characteristics (e.g., screen size) of a display device at which the content will be displayed. In one example, the computing device includes a rendering engine for rendering content (e.g., an HTML-based email message) for display at the display device. The computing device may receive content from a remote computing system (e.g., an e-mail server). Prior to rendering the content, the rendering engine of the computing device dynamically modifies one or more attribute parameters of one or more individual elements that each define a portion of the content such that, when rendered, the one or more individual elements of the content are sized to fit within the screen size of the display device. Thus, rather than relying entirely on techniques in which a rendering engine, subsequent to rendering the content, produces a rendering based on one or more predefined screen layouts to size the entire rendering to fit at least a dimension (e.g., width or height) of the screen size of a display device, the rendering engine described herein identifies specific attribute parameters (e.g., metadata) associated with elements of the content. Prior to rendering the content, the rendering engine modifies the identified attributes within the content in a way to subsequently cause the rendering engine to produce an improved rendering (e.g., a legible and/or recognizable rendering), having a width and/or height which fits a width and/or height of the screen size of the display device at which the content is to be displayed.

In this way, when producing content (e.g., a webpage, an e-mail, etc.) for subsequent display on a computing device, a content developer need not embed specific attributes within the content (e.g., by way of cascaded style sheets (CSSs), media queries, etc.) to cause a rendering engine to size the rendering to fit the size of the screen at which the rendering is to be displayed. Additionally, when transmitting content for subsequent display on a computing device, a source of the content (e.g., an email or web server) need not specifically tailor attributes of the content to cause a rendering engine of the receiving computing device to size the rendering to fit the size of the screen at which the rendering is to be displayed. After receiving the content and prior to rendering the content, the computing device automatically modifies attributes associated with portions of the content (e.g., elements) that are identified for resizing (e.g., one or more elements that have attributes which are not compatible with the size of the screen). The computing device renders the content to maximize the size of each identified element based on the size of a screen rather than maximize the size of the content as a whole to fit the screen. A computing device that presents adjusted content in this way may provide a better user experience when viewing rendered content that is output for display on a screen. In addition, the computing device according to these techniques may require fewer inputs (e.g., from a user) to manipulate (e.g., resize, zoom-in, zoom-out) a presentation of rendered content since the content is pre-adjusted based on the screen size prior to rendering. By requiring less input in response to the presentation of a rendering, the computing device may use less computing resources and electrical power than other computing devices.

FIG. 1 is a conceptual diagram illustrating an example computing system which includes an example computing device configured to automatically modify content prior to rendering the content for display, in accordance with one or more aspects of the present disclosure. Computing system 1 of FIG. 1 is an example computing system that includes computing device 10, information server system 60, and network 30.

Network 30 represents any public or private communication network, for instance, a cellular, Wi-Fi, and/or other type of network for transmitting data between computing devices. Computing device 10 and information server system 60 may send and receive data across network 30 using any suitable communication techniques. For example, computing device 10 may be operatively coupled to network 66 using network link 32A. Information server system 60 may be operatively coupled to network 30 by network link 32B. Network 30 may include network hubs, network switches, network routers, etc., that are operatively inter-coupled thereby providing for the exchange of information between computing device 10 and information server system 60. In some examples, network links 32A and 32B may be Ethernet, ATM or other network connections. Such connections may be wireless and/or wired connections.

Information server system 60 represents any suitable remote computing system, such as one or more desktop computers, laptop computers, mainframes, servers, cloud computing systems, etc. capable of sending and receiving information across network link 32B to network 30. In some examples, information server system represents a host server for a webpage (e.g., on the Internet). One or more computing devices, such as computing device 10, may access a webpage hosted by information server system 60 on the Internet. In some examples, information server system represents an e-mail server for hosting and providing enterprise and/or web-based e-mail services to system 1. One or more computing devices, such as computing device 10, may send and receive e-mail messages through information server system 60 which acts as an e-mail message transfer agent. In some examples, information server system 60 represents a cloud computing system that provides one or more services through network 30. One or more computing devices, such as computing device 10, may access the one or more services provided by the cloud using information server system 30.

In the example of FIG. 1, information server system 60 includes content manager module 62. Content manager module 62 may perform operations described using software, hardware, firmware, or a mixture of hardware, software, and firmware residing in and/or executing at information server system 60. Information server system 60 may execute content manager module 62 with multiple processors or multiple devices. Information server system 60 may execute content manager module 62 as a virtual machine executing on underlying hardware. Content manager module 62 may execute as a service of an operating system or computing platform. Content manager module 62 may execute as one or more executable programs at an application layer of a computing platform.

Content manager module 62 may perform functions for routing content between one or more computing devices, such as computing device 10, over network 30. For example, content manager module 62 may perform functions for hosting a webpage and outputting content associated with the webpage in response to a request from a browser executing at to computing device 10. Content manager module 62 may perform functions of an e-mail message transfer agent (e.g., a mail server) and route e-mail messages between one or more computing devices, such as computing device 10, on network 30. For example, content manager module 62 may receive an e-mail message addressed to an e-mail account associated with computing device 10 and send the e-mail message across network 30 to computing device 10. Computing device 10 may receive data (e.g., an e-mail, a webpage, etc.) that includes one or more elements that specify content in accordance with a markup language (e.g., HTML) from content manager module 62 of information server system 60 via network link 32B.

In the example of FIG. 1, computing device 10 is a mobile computing device (e.g., a mobile phone). However, in other examples, computing device 10 may be a tablet computer, a personal digital assistant (PDA), a laptop computer, a gaming system, a media player, an e-book reader, a television platform, an automobile navigation system, a wearable computing device (e.g., a watch, eyewear, a glove), or any other type of mobile or non-mobile computing device.

As shown in FIG. 1, computing device 10 includes a user interface device (UID) 12. UID 12 of computing device 10 may function as an input device for computing device 10 and as an output device. UID 12 may be implemented using various technologies. For instance, UID 12 may function as an input device using a presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. UID 12 may function as an output (e.g., display) device using any one or more display devices, such as a liquid crystal display (LCD), dot matrix display, light emitting diode (LED) display, organic light-emitting diode (OLED) display, e-ink, or similar monochrome or color display capable of outputting visible information to a user of computing device 10.

UID 12 of computing device 10 may include a presence-sensitive display that may receive tactile input from a user of computing device 10. UID 12 may receive indications of the tactile input by detecting one or more gestures from a user of computing device 10 (e.g., the user touching or pointing to one or more locations of UID 12 with a finger or a stylus pen). UID 12 may present output to a user, for instance at a presence-sensitive display. UID 12 may present the output as a graphical user interface (e.g., user interface 14A or user interface 14B), which may be associated with functionality provided by computing device 10. For example, UID 12 may present various user interfaces of components of a computing platform, operating system, applications, or services executing at or accessible by computing device 10 (e.g., an electronic message application, an Internet browser application, a mobile operating system, etc.). A user may interact with a respective user interface to cause computing device 10 to perform operations relating to a function.

Computing device 10 may include user interface ("UI") module 20 and rendering engine module 22. Modules 20 and 22 may perform operations described using software, hardware, firmware, or a mixture of hardware, software, and firmware residing in and/or executing at computing device 10. Computing device 10 may execute modules 20 and 22 with one or more processors. Computing device 10 may execute modules 20 and 22 as a virtual machine executing on underlying hardware. Modules 20 and 22 may execute as a service or component of an operating system or computing platform. Modules 20 and 22 may execute as one or more executable programs at an application layer of a computing platform. UID 12 and modules 20 and 22 may be otherwise arranged remotely to and remotely accessible to computing device 10, for instance, as one or more network services operating at network 30 in a network cloud.

Rendering engine module 22 of computing device 10 renders content for display by computing device 10. In other words, rendering engine module 22 may generate a rendering of display data (e.g., information) and send the rendering to UI module 20 to cause UID 12 to display an image of the rendering at UID 12. Rendering engine module 22 may render content of display data that includes one or more attributes and/or elements that each specify respective content in accordance with a markup language, such as hypertext markup language (HTML). For instance, rendering engine module 22 may parse HTML-based display data for content bounded by elements having attributes, apply presentation properties to the content defined within the display data or by external sets of presentation properties (e.g., Cascaded Style Sheets (CSS)), and otherwise modify the content to produce a rendering (e.g., image) of the content for display.

For example, as shown in FIG. 1, UI module 20 may cause UID 12 to present user interfaces 14A and 14B. User interfaces 14A and 14B include graphical indications (e.g., elements) displayed at various locations of UID 12. For example, UI module 20 may receive HTML-based display data from an application, an operating system, and/or other computing platform, executing at or remote to computing device 10. The HTML-based display data may provide instructions used by rendering module 22 for producing a rendering of user interfaces 14A and 14B. UI module 20 may send the HTML-based display data, or a pointer to the location of the display data in a memory of computing device 10, to rendering engine module 22 to have rendering engine module 22 render the content of the HTML-based display data into a format that UI module 20 can use to cause UID 12 to output an image of the content (e.g., a rendering) for display. UI module 20 may cause UID 12 to output user interface 14A, user interface 14B, or another example user interface, for display and, as a user interacts with the user interface presented at UID 12, UI module 20 may interpret inputs detected at UID 12 (e.g., as a user provides one or more gestures at a location of UID 12 at which user interface 14A, user interface 14B, or another example user interface is displayed). UI module 20 may relay information about the inputs detected at UID 12 to one or more associated applications, operating systems, and/or computing platforms executing at or remote to computing device 10 and associated with the user interface, to cause computing device 10 to perform a function.

User interfaces 14A and 14B are two examples graphical user interfaces of an application for presenting display data (e.g., an e-mail message, a webpage, etc.) which includes content in accordance with a markup language. User interfaces 14A and 14B each include graphical content displayed at various locations of UID 12. The graphical content of user interfaces 14A and 14B may be defined by one or more elements that specify the appearance of the content when rendered for display at UID 12 in accordance with a markup language (e.g., HTML). An attribute of the one or more elements may define a size, a color, a font, or other characteristic of at least a portion of the content specified by the element.

For example, FIG. 1 shows user interface 14A that has page 16A and user interface 14B that has page 16B. Pages 16A and 16B each represent the body of an HTML-based e-mail message and each have content of the e-mail message specified by elements in accordance with HTML. Page 16A shows content rendered for display without modifications to the attributes of elements that specify portions of the content in accordance with the techniques described herein and page 16B shows content rendered for display with modification to the attributes of elements that specify portions of the content in accordance with the techniques described herein.

In the example of FIG. 1, page 16A includes image 17A which represents a portion of content specified by an image element, table 18A which represents a portion of content specified by a table element, and table-data-field 19A which represents a portion of content specified by table data field element. In the example of FIG. 1, page 16B includes image 17B which represents a portion of content specified by an image element, a portion of content specified by table element 18B, and a portion of content specified by table data field element 19B.

Pages 16A and 16B convey the same HTML-based e-mail message when presented at UID 12, however, when computing device 10 presents page 16B, adjustments are made to portions of the content of page 16B by rendering engine module 22, prior to rendering the content, based on the screen size of UID 12, to provide a better viewing experience of the HTML-based e-mail message when the HTML-based e-mail message is presented at UID 12. For example, prior to rendering the content of page 16B, rendering engine module 22 may identify those elements of page 16B that have an attribute that defines a size of at least a portion of the content specified by the element, and may modify the attribute to adjust the size of the portion of the content of page 16B specified by the element based on the screen size of UID 12.

In operation, computing device 10 may receive an HTML-based e-mail message from content manager module 62 of information server system 60. UI module 20 of computing device 10 may cause rendering engine module 22 to produce a rendering of the e-mail message which UI module 20 can use for causing UID 12 to present an image of the e-mail message. However, prior to rendering the e-mail message, rendering engine module 22 is configured to first determine whether any modifications can be made to any of the attributes of the e-mail message that will improve the readability or viewing experience of a rendering of the e-mail message when the rendering is presented at UID 12.

Rendering engine module 22 may identify an element that specifies content in accordance with a markup language, an attribute of the element defines a size of at least a portion of the content specified by the element. For example, rendering engine module 22 may parse the HTML code of the e-mail message to identify an element which has an attribute that specifies either the height and/or the width of a portion of the content of the e-mail message. Rendering engine module 22 may identify the image element that specifies the portion of content corresponding to image 17B as an element that has a width or height attribute that specifies the width or height of image 17B. Rendering engine module 22 may identify the table element that specifies the portion of content corresponding to table 18B as an element that has a width or height attribute that specifies the width or height of table 18B. Rendering engine module 22 may identify the table-data-field element that specifies the portion of content corresponding to table-data-field 19B as an element that has a width or height attribute that specifies the width or height of table-data-field 19B.

Prior to rendering the content specified by the element for display at a display device, rendering engine module 22 may modify, based at least in part on a screen size of the display device, the attribute of the element to adjust the size of the portion of the content specified by the element based on the screen size of the display device. For example, rendering engine module 22 may modify a width attribute of the image element that specifies image 17B to replace an original value associated with the width or height attribute with a new value defined by a set of presentation properties (e.g., Cascaded Style Sheets) associated with UID 12 to either expand or reduce the width of image 17B to fit the screen size of UID 12. Similarly, rendering engine module 22 may modify the width attribute of the table element and/or table-data-field element that specifies table 18B and/or table-data-field 19B to replace an original value associated with the width or height attribute with a new value defined by the set of presentation properties (e.g., Cascaded Style Sheets) associated with UID 12 to either expand or reduce the width of table 18B and/or table-data-field 19B to fit the screen size of UID 12.

Rendering engine module 22 may render, for display, the content in accordance with the element. For example, after modifying one or more attributes of one or more elements that specify image 17B, table 18B, table-data-field 19B, and/or other portions of the content of page 16B, rendering engine module 22 may render (using suitable rendering techniques) the HTML of page 16B to produce a rendering that UI module 20 can use to cause UID 12 to present an image of the HTML-based e-mail message at UID 12.

Rather than require a producer of content to embed specific attributes within the content (e.g., by way of cascaded style sheets (CSSs), media queries, etc.) for rendering the content for display at a computing device, and rather than require a source of the content to specifically tailor attributes of the content for rendering the content for display at a computing device, computing device 10 automatically (e.g., without user intervention) and dynamically (e.g., in real-time) modifies attributes associated with portions of the content to resize the content to fit the screen size the display device and to improve the viewing experience and the readability of the content when displayed at the display device. Said differently, those portions of content that have attributes which are not compatible with the screen size of the display device may be individually modified prior to rendering the entire content, thereby preventing the viewing experience or the readability of a portion of the content that already fits the screen size of the display device from deteriorating. The resultant rendering may be further scaled post rendering. A computing device that presents adjusted content in this way may provide a better user experience when viewing rendered content that is output for display on a screen. In addition, the computing may require fewer inputs (e.g., from a user) to manipulate (e.g., resize, zoom-in, zoom-out, scroll, etc.) a presentation of rendered content since only those portions of content that need adjustment may be resized while the other portions may be left unmodified. By requiring less input in response to the presentation of a rendering, the computing device may use less computing resources and electrical power than other computing devices.

Figure 2:
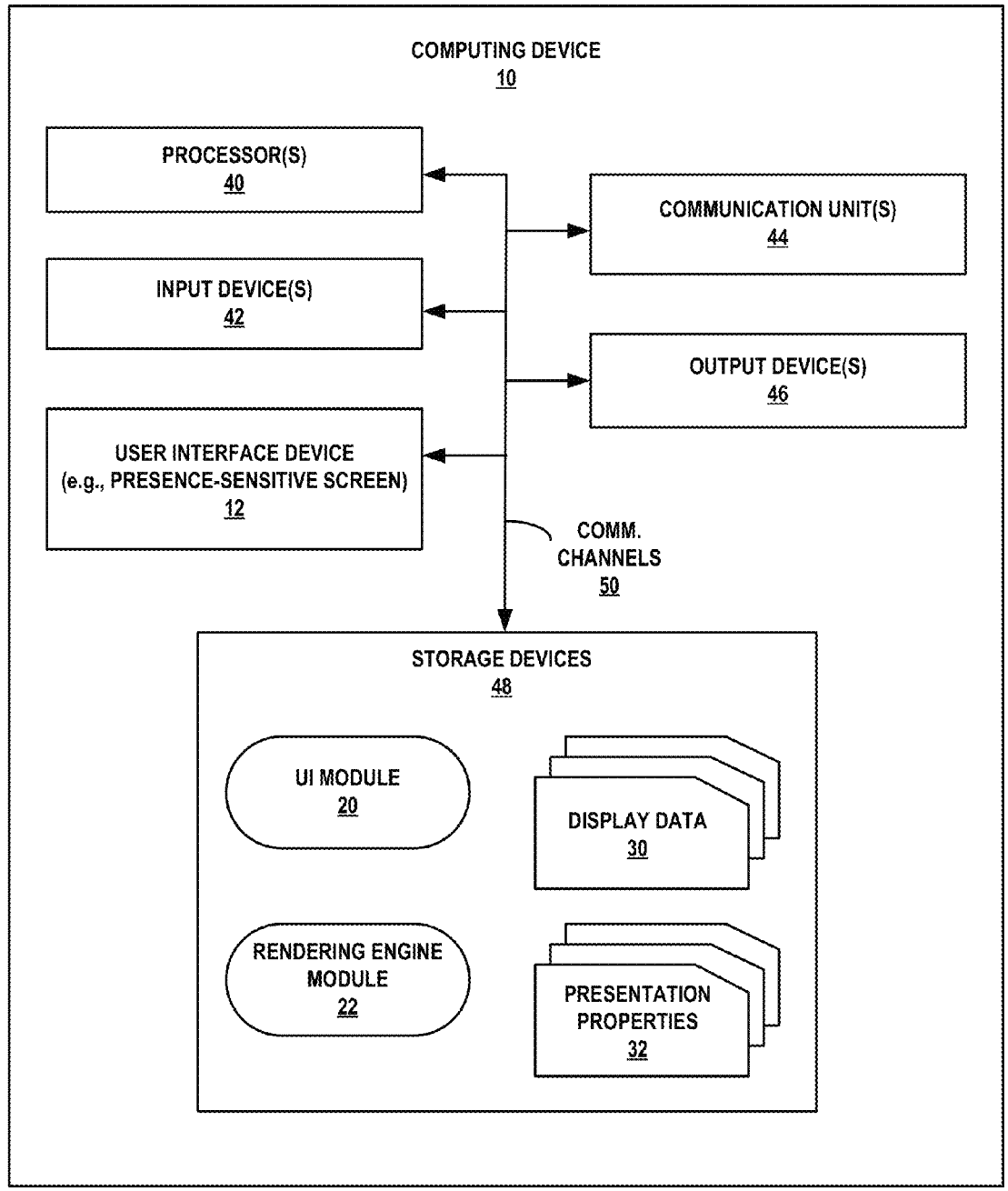
FIG. 2 is a block diagram illustrating an example computing device configured to automatically modify content prior to rendering the content for display, in accordance with one or more aspects of the present disclosure.

FIG. 2 is a block diagram illustrating an example computing device configured to automatically modify content prior to rendering the content for display, in accordance with one or more aspects of the present disclosure. FIG. 2 illustrates only one particular example of computing device 10 and many other examples of computing device 10 may be used in other instances. In the example of FIG. 2, computing device 10 may be a mobile computing device (e.g., a mobile phone, a watch, a laptop computer, etc.) or a non-portable computing device (e.g., desktop computer, a server, etc.). Computing device 10 of FIG. 2 may include a subset of the components included in example computing device 10 or may include additional components not shown in FIG. 2.

As shown in the example of FIG. 2, computing device 10 includes user interface device 12 ("UID 12"), one or more processors 40, one or more input devices 42, one or more communication units 44, one or more output devices 46, and one or more storage devices 48. Storage devices 48 of computing device 10 also include UI module 20 and rendering engine module 22. UI module 20 and rendering engine module 22 may rely on information stored at storage device 48 as display data 30 and presentation properties 32. In other words, as is described in more detail below, UI module 20 and rendering engine module 22 may be operable by processors 40 to perform read/write operations on information, stored as display data 30 and presentation properties 32, at storage device 48 to perform a function of computing device 10.

Communication channels 50 may interconnect each of the components 12, 20, 22, 30, 32, 40, 42, 44, 46, and 48 for inter-component communications (physically, communicatively, and/or operatively). In some examples, communication channels 50 may include a system bus, a network connection, an inter-process communication data structure, or any other method for communicating data.

One or more input devices 42 of computing device 10 may receive input. Examples of input are tactile, audio, and video input. Input devices 42 of computing device 10, in one example, includes a presence-sensitive display, touch-sensitive screen, mouse, keyboard, voice responsive system, video camera, microphone or any other type of device for detecting input from a human or machine.

One or more output devices 46 of computing device 10 may generate output. Examples of output are tactile, audio, and video output. Output devices 46 of computing device 10, in one example, includes a presence-sensitive display, sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more wired and/or wireless networks by transmitting and/or receiving network signals on the one or more networks. Examples of communication unit 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless network radios, as well as universal serial bus (USB) controllers.

In some examples, UID 12 of computing device 10 may include functionality of input devices 42 and/or output devices 46. In the example of FIG. 2, UID 12 may be or may include a presence-sensitive input device. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 46, e.g., at a display. In the example of FIG. 2, UID 12 presents a user interface (such as user interfaces 14A and 14B of FIG. 1).

While illustrated as an internal component of computing device 10, UID 12 also represents and external component that shares a data path with computing device 10 for transmitting and/or receiving input and output. For instance, in one example, UID 12 represents a built-in component of computing device 10 located within and physically connected to the external packaging of computing device 10 (e.g., a screen on a mobile phone). In another example, UID 12 represents an external component of computing device 10 located outside and physically separated from the packaging of computing device 10 (e.g., a monitor, a projector, etc. that shares a wired and/or wireless data path with a tablet computer).

One or more storage devices 48 within computing device 10 may store information for processing during operation of computing device 10 (e.g., computing device 10 may store data accessed by modules 20 and 22 during execution at computing device 10). In some examples, storage device 48 is a temporary memory, meaning that a primary purpose of storage device 48 is not long-term storage. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or information (e.g., data) associated with modules 20 and 22, and display data 30 and presentation properties 32.

One or more processors 40 may implement functionality and/or execute instructions within computing device 10. For example, processors 40 on computing device 10 may receive and execute instructions stored by storage devices 48 that execute the functionality of UI module 20 and rendering engine module 22. These instructions executed by processors 40 may cause computing device 10 to store information, such as display data 30 and/or presentation properties 32, within storage devices 48 during program execution. Processors 40 may execute instructions of modules 20 and 22 to cause UID 12 to render portions of content of display data 30 according to some of presentation properties 32 to present the rendered content as one of user interfaces 14A and 14B at UID 12. That is, modules 20 and 22 may be operable by processors 40 to perform various actions or functions of computing device 10, for instance, causing UID 12 to present user interfaces 14A and 14B at UID 12.

Display data 30 and presentation properties 32 are respectively, information (e.g., files) that includes renderable content in accordance with a markup language and associated presentation properties that may be applied to the renderable content. For instance, display data 30 may be one or more HTML-based files (e.g., e-mail messages, webpages, etc.) that include content which rendering engine module 22 may render to create image data that UI module 20 can present at UID 12. Presentation properties 32 may be one or more CSS files referenced by display data 30 that rendering engine module 22 may use to modify and/or format portions of the content of display data 30 during rendering.

Computing device 10 may receive, from a computing system, content in accordance with a markup language (e.g., an HTML) which is specified by one or more elements (e.g., specific portions of the content that have particular attributes). The content may be associated with an (HTML-based) e-mail message or a webpage. For example, computing device 10 may receive network traffic from content manager module 62 of information server system 60 which includes an HTML-based e-mail message. Communication units 44 may process the network traffic received by computing device 10 and transfer data indicative of the e-mail message to UI module 20. UI module 20 may store the content as display data 30. UI module 20 may cause rendering engine module 22 to produce a page rendering (e.g., page 16B) of the e-mail message stored as display data 30 which UI module 20 may include as part of user interface 14B that UI module 20 causes UID 12 to output for display.

Rendering engine module 22 may retrieve the content of the e-mail message from display data 30, and may identify an element that specifies content in accordance with a markup language (e.g., HTML) which has an attribute that defines a size of at least a portion of the content specified by the element. For example, rendering engine module 22 may parse the content for one or more image elements (e.g., an <IMG> tag), block elements (e.g., a <DIV> tag), table elements (e.g., a <TABLE> tag), table-data-field elements (e.g., a <TD> tag), or other elements that bound portions of the content and that have a size attribute (e.g., width, height, etc.) that specifies the size of the portion of the content for display.

Prior to rendering the portion of the content specified by the one or more identified elements, rendering engine module 22 may modify, based at least in part on a screen size of UID 12, the (size) attributes of each of the one or more identified elements to adjust the size of the various portions of the content specified by each of the one or more identified elements based on the screen size of UID 12. For example, rendering engine module 22 may replace a fixed value associated with the size attribute of an image element with a new value defined by a cascaded style sheet (e.g., stored as presentation properties 32) to cause the size of the portion of the content specified by the image element to fit (e.g., adjust to) the screen size of UID 12 when UID 12 presents a rendering of the content. In other words, contrary to page 16A shown in FIG. 1 which illustrates image element 17A having a predefined or fixed value associated with the size attribute of image element 17A, page 16B of FIG. 1 illustrates a rendering of image element 17B which has size attribute that has been modified by rendering engine module 22 prior to rendering. The value associated with the modified size attribute of image element 17B is defined by data stored as presentation properties 32 and based on the screen size of UID 12 rather than being defined by the original predefined or fixed value size attribute associated with image element 17A.

Rendering engine module 22 may render the content in accordance with the element to produce an image of the content (e.g., page rendering 16B). UI module 20 may cause UID 12 to present the rendering of the modified display data 30 (e.g., user interface 14B of FIG. 1).

Figure 3:
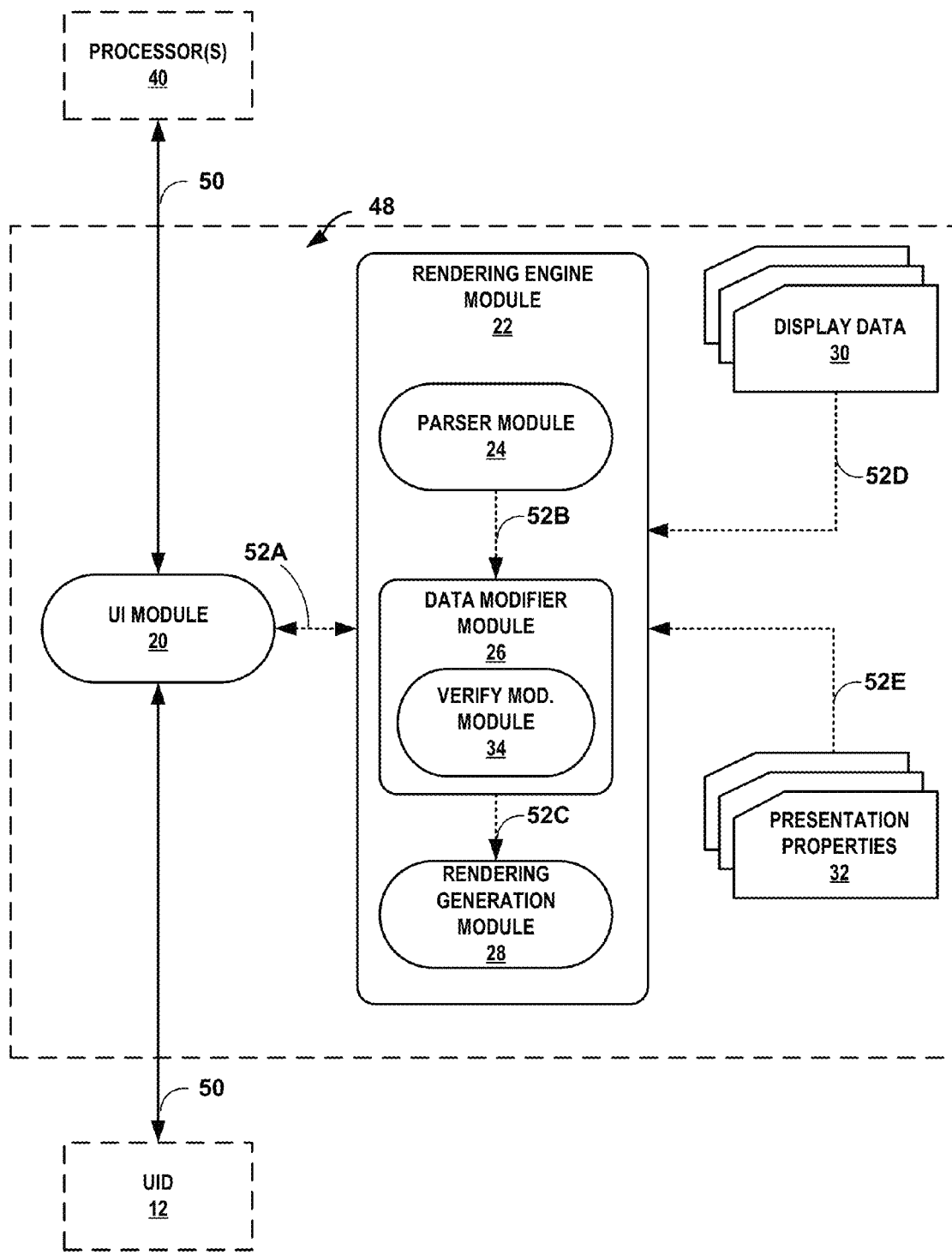
FIG. 3 is a block diagram illustrating a more detailed view of portions of the example computing device illustrated in FIG. 2.

FIG. 3 is a block diagram illustrating a more detailed view of portions of the example computing device illustrated in FIG. 2. FIG. 3 is described within the context of computing device 10 of FIGS. 1 and 2.

For instance, similar to computing device 10 of FIG. 2, FIG. 3 shows one or more processors 40, storage devices 48, and UID 12 all linked by communication channels 50. Rendering engine module 22 of FIG. 3 includes parser module 24, data modifier module 26, and rendering generation module 28 as subcomponents for performing the operations of rendering engine module 22. Verify modification module 34 exists as a further subcomponent within data modifier module 26. UI module 20, rendering engine module 22, parser module 24, data modifier module 26, rendering generation module 28, display data 30, presentation properties 32, and verify modification module 34 are linked via logical data paths 52A-52E (collectively "data paths 52"). Each of data paths 52 represents a one-way or two-way logical connection between modules 20, 22, 24, 26, 28, and 34, as well as display data 30 and presentation properties 32. For instance, data path 52A may facilitate the two-way communication of data between UI module 20 and rendering engine module 22. Data path 52B and data path 52C may facilitate the one-way communication of data between modules 24 and 26 and modules 26 and 28 respectively. Data path 52D may facilitate the two-way communication of data between rendering engine module 22 and display data 30, and data path 52E may facilitate the one-way communication of data from presentation properties 32 and rendering generation module 28.

Parser module 24 may perform operations on behalf of rendering engine module 22 related to parsing display data 30 to identify one or more elements in display data 30 that have attributes that define a size of the content of display data 30. For instance, parser module 24 may be a script (e.g., embedded Java script language within an HTML-file of display data 30) that, when invoked by rendering engine module 22, performs read operations over data path 52D to parse an HTML-based e-mail message stored as display data 30 to identify one or more elements that have size related attributes. Table 1 (below) shows various examples of HTML-based pseudo code in which an element (e.g., a block element, an image element, a table element, a table-data-field element, etc.) has an attribute (e.g., style, width, nowrap, etc.) that parser module 24 may identify as defining a size of a portion of content specified by the element.

TABLE 1

| # | TYPE | Example pseudo code |
|---|---|---|
| 1 | Block | <div style="width: 500px;"> |
| 2 | Block | <div style="min-width: 500px;"> |
| 3 | Image | <img width="600" height="400'> |
| 4 | Image | <img style="width: 600px; height: 400px;"> |
| 5 | Table | <table width="600"> |
| 6 | Table | <table style="width: 600px;"> |
| 7 | Table-data-field | <td width="640"> |
| 8 | Table-data-field | <td nowrap> very long text goes here...</td> |
| 9 | Table-data-field | <td style="white-space: nowrap;">very long text goes here...</td> |

In some examples, parser module 24 may identify a block element, in accordance with HTML which has a width attribute or a style attribute of the block element in accordance with HTML, as being an element that has a size-related attribute that data modifier module 26 may modify based on a screen size of a display device. For example, with regard to example number 1 of Table 1, parser module 24 may identify the "style" attribute of the block element <div> as having a fixed "width" parameter with a predefined value of "500" pixels. With regard to example number 2 of Table 1, parser module 24 may identify the "style" attribute of the block element <div> as having a fixed "min-width" parameter with a predefined value of "500" pixels.

In some examples, parser module 24 may identify an image element in accordance with HTML which has a width attribute, a height attribute, or a style attribute of the image element in accordance with HTML, as being an element that has a size related attribute that data modifier module 26 may modify based on a screen size of a display device. Looking at example number 3 of Table 1, parser module 24 may identify the "width" and "height" attributes of the image element <img> as having fixed dimensions of "600" by "400". Similarly, with regard to example 4 of Table 1, parser module 24 may identify the "style" attribute of the image element <img> as having a fixed "width" and "height" dimensions of "600" pixels by "400" pixels.

In some examples, parser module 24 may identify a table element in accordance with HTML which has a width attribute or a style attribute of the table element in accordance with HTML, as being an element that has a size related attribute that data modifier module 26 may modify based on a screen size of a display device. With regard to example numbered 5 Table 1, parser module 24 may identify the "width" attribute of the table element <table> as having a fixed value of "600", and with regard to example number 6, parser module 24 may identify the "style" attribute of the table element <table> as having a fixed "width" parameter of "600" pixels.

In some examples, parser module 24 may identify a table-data-field element in accordance with HTML which has a width attribute, a style attribute, or a nowrap attribute of the image element in accordance with HTML, as being an element that has a size related attribute that data modifier module 26 may modify based on a screen size of a display device. Looking at example number 7 of Table 1, parser module 24 may identify the "width" attribute of the table-data-field element <td> as having a fixed value of "640". With regard to examples 8 and 9 of Table 1, parser module 24 may identify a "nowrap" attribute or a "style" attribute with a "nowrap" parameter as both being attributes that define the size or format of the text specified by the respective table-data-element <td>.

In some examples, parser module 24 may identify an element which has a size related attribute that exceeds the document width of UID 12 as being an element suitable for modification by data modifier module 26. For example, parser module 24 may determine whether a width attribute of an image element has a width that exceeds the document with of UID 12. If the width of the image exceeds the document width, parser module 24 may identify the image element as being an element for modification by data modifier module 26. If the width of the image element does not exceed the document width of UID 12, parser module 24 may identify the image element as not being an element for modification by data modifier module 26.

Data modifier module 26 may receive an indication of the one or more elements identified by parser module 24 and may modify the respective attribute of each of the identified one or more elements to adjust the size of the content specified by each identified element based on the screen size of a display device, such as UID 12. For example, data modifier module 26 may, prior to any rendering of display data 30, perform write operations on display data 30 to change the original value associated with a "style" or "width" attribute of an element to a new value (e.g., different than the original value) based on the screen size of UID 12.

In some examples, data modifier module 26 may modify the attribute of the element to adjust the size of the portion of the content specified by the element, based on a set of presentation properties (e.g., a CSS of presentation properties 32) associated with UID 12. Data modifier module 26 may replace an original value associated with the attribute with a new value defined by the set of presentation properties. For instance, with respect to pseudo code example 3 of table 1, data modifier module 26 may rewrite portions of display data 30 to change the value of the "width" attribute of the image element <img>, from a value of "600" to a value of "auto", the new value of "auto" being defined by a set of presentation properties 32 (e.g., a CSS) associated with UID 12. In other words, data modifier module 26 may change the width of the image element from being a predefined width to being an adjusted width defined by a CSS and associated with the screen size of UID 12. When rendering engine module 22 generates a rendering of the modified display data which references the "auto" parameter, rendering engine module 22 may apply the CSS (e.g., the set of presentation properties 32) to the portion of the content of display data 30 to adjust the size of the portion of the content accordingly. With respect to pseudo code example 4 of table 1, data modifier module 26 may rewrite portions of display data 30 to change the value of the "style" attribute of the image element <img>, from a value of "width: 600 px; height: 400 px" to a value of "width: 100%; height: auto; max-width: $DOCWIDTH", the new value being defined by a set of presentation properties 32 (e.g., a CSS) associated with UID 12. In other words, data modifier module 26 may change the width and height of the image element from being a predefined width to being an adjusted width and height defined by a CSS and associated with the screen size of UID 12. When rendering engine module 22 generates a rendering of the modified display data which references the "width: 100%; height: auto; max-width: $DOCWIDTH" style parameter, rendering engine module 22 may apply the set of presentation properties 32 (e.g., CSS) to the portion of the content of display data 30 to adjust the size of the portion of the content accordingly. The parameter $DOCWIDTH in this example represents the "view width" of UID 12 and may be a run-time variable or actual numerical value. In some examples, rendering engine module 22 may replace the variable $DOCWIDTH with the actual view width dimension value (e.g., 320 px) during execution.

In some examples, data modifier module 26 may rely on verify modification module 34 to perform a validation of the adjustments made by data modifier module 26 to the attributes of identified elements of display data 30. Verify modification module 34 may compare the modified display data 30 to an improvement threshold (e.g., for determining whether the modification to display data 30 will improve the overall presentation of the content of display data 30 when presented as a rendering at UID 12. If the adjustments do not satisfy the improvement threshold, verify modification module 34 may cause data modifier module 26 to revert or back-out the adjustments previously made to display data 30. In other words, responsive verify modification module 34 determining that the content of display data 30 does not satisfy an improvement threshold, data modifier module 26 may modify the previously modified attributes of the one or more identified elements to revert the modifications to the attributes based on the screen size of UID 12.

For example, data modifier module 26 may utilize scratch space of display data 30 to store a revision history as modifications are made to display data 30. Within the scratch space of display data 30, data modifier module 26 may store an original value of an attribute of an identified element prior to modifying the value of the attribute based on the screen size of UID 12. After modifying display data 30, verify modification module 34 may compare one or more dimensions of the content of display data 30 (e.g., document width) to a threshold. If the one or more dimensions do not satisfy an improvement threshold, data modifier module 26 may back out the modifications made to display data 30 by causing the modified attributes to revert back to the original values stored in the scratch space of display data 30. In some examples, the improvement threshold may correspond to the screen size of UID 12. For instance, verify modification module 34 may determine that a modification satisfies the improvement threshold if the new document width of display data 30 is less than or equal to the screen size of UID 12. In some examples, the improvement threshold may correspond to a percentage of the screen size of UID 12. For instance, verify modification module 34 may determine that a modification satisfies the improvement threshold if the new document height or width of display data 30 is seventy percent less than the original document height or width.

In some examples, data modifier module 26 may perform modifications to attributes of particular types of elements of display data 30, prior to modifying the attributes of other types of elements of display data 30. For instance, data modifier module 26 may perform modifications to the attributes of block elements identified by parser module 24 first, followed by modifications to the attributes of image elements second, followed by modifications to the attributes of table elements third, and lastly, followed by modifications to the table-data-field elements last. After modifying each type of attribute, data modifier module 26 may rely on verify modification module 34 to perform a validation of the adjustments. If verify modification module 34 determines that the last modification to be performed did not result in an improvement of the content of display data 30, data modifier module 26 may refrain from performing subsequent modifications to display data 30.

Rendering generation module 28 may receive an indication from data modifier module 26 that the modifications to display data 30 based on the screen size of UID 12 are complete and/or validated and may generate a rendering, of the content of display data 30 in accordance with the elements and presentation properties 32. For example, following the modifications performed by data modifier module 26 of display data 30 to adjust one or more size attributes based on the screen size of UID 12, rendering generation module 28 may produce a rendering (e.g., an image file) of the content of display data 30 by applying display characteristics (e.g., portions of presentation properties 32, such as one or more CSS) to portions of display data 30. Rendering generation module 28 may cause rendering engine module 22 to output the rendering (e.g., the image file) to UI module 20. Responsive to rendering engine module 22 rendering the content of display data 30 for display, UI module 20 may cause UID 12 to output a graphical indication of the content of display data 30 for display, for example, as page 16B of user interface 14B of FIG. 1.

Computing device 10 may receive an HTML-based e-mail message from content manager module 62 of information server system 60, and store the e-mail message as display data 30 at storage device 40. UI module 20 may cause rendering module 22 to provide a rendering of the content of the e-mail message stored as display data 30 that UI module 20 use to cause UID 12 to output a graphical indication of page 16B (e.g., the content of the HTML-based e-mail message) for display within user interface 14B.

Rendering engine module 22 may invoke parser module 24 to identify, from among one or more elements (e.g., block, image, table, table-data-field, etc.) that each specify respective content in accordance with a markup language (e.g., HTML) and each have at least one attribute that defines a size of a portion of the respective content. For instance, parser module 24 may search for and identify image elements that have a style, height, width attribute, block elements that have a style or width attribute, table elements that have a style or width attribute, table-data-field elements that have a style, width, or nowrap attribute, etc.

Prior to rendering the content specified by the element for display at a display device, rendering engine module 22 may invoke data modifier module 26 to cause data modifier module 26 to modify, based at least in part on the screen size of UID 12, the respective attribute of each of the one or more identified elements to adjust the size of the portion of the content specified by the element based on the screen size of the display device. For example, data modifier module 26 may change the values of the different attributes associated with the identified elements, to adjust the size of the portion of the content specified by the elements, and defined by the attributes, to conform to the screen size of UID 12. In some examples, rendering engine module 22 may assign each attribute with a value defined by a set of presentation properties 32 (e.g., a CSS). In some examples, verify modification module 34 may compare the adjusted size of the content defined by the modified display data 30 with the original size of the content defined by the unmodified display data 30 to determine whether the modified display data 30 satisfies an improvement threshold. In some examples, if the improvement threshold is not satisfied, data modifier module 26 may undo the changes or adjustments made to the values of the attributes associated with the one or more identified elements by replacing the new values of the attributes with the original values (e.g., stored in scratch space of display data 30).

Rendering engine module 22 may invoke rendering generation module 28 to cause rendering generation module 28 to render, for display the content in accordance with the one or more identified elements. For instance, rendering generation module 28 may perform HTML-based rendering operations on display data 30, applying display characteristics defined by one or more CSS of presentation properties 32, to produce a graphical indication (e.g., a rendering) of the content of display data 30. UI module 20 may cause UID 12 to present a graphical indication of the content for display (e.g., as page 16B of user interface 14B).

In some examples, computing device 10 may receive an indication of an input to change a magnification level associated with the graphical indication of the content. Computing device 10 may validate, based on the input, the modification to the attribute of the element to adjust the size of the portion of the content specified by the element based on the screen size of the display device. For instance, a user of computing device 10 may provide an input, such as a gesture at UID 12, to cause computing device 10 to enlarge or reduce the size (e.g., the magnification) of the graphical indication of the content at UID 12. Verify modification module 34 of rendering engine module 22 may receive an indication of the input from UI module 20 and based on the input, determine whether the modification of display data 30 by data modifier module 26 improved the viewing experience of the content of display data 30 at UID 12 or whether the modification by data modifier module 26 did not improve the viewing experience of the content of display data 30 at UID 12. In other words, verify modification module 34 may determine that when no inputs are received by computing device 10 after presenting a graphical indication of modified display data 30 that the modification was successful, and otherwise determine that when inputs are received by computing device 10 after presenting a graphical indication of modified display data 30, that the modification was not successful.

In response to determining that frequent inputs to change the magnification level associated with the graphical indication of the content are received, verify modification module 34 may adjust the improvement threshold used to validate the modification. For example, verify modification module 24 may decrease the improvement threshold if the user provides frequent input to magnify the graphical indication (e.g., indicating that the content is too small even after modification) or increase the improvement threshold if the user proved frequent input to reduce the magnification of the graphical indication (e.g., indicating that the content is too large even after modification).

In some examples, computing device 10 may utilize one or more gates within rendering engine module 22 to determine whether or not to cause data modifier module 26 to modify content, prior to causing rendering generation module 28 to render the content for display. Computing device 10 may determine whether the content is too complex for modification. Computing device 10 may determine that a characteristic of the content does not satisfy a complexity threshold, and responsive to determining that the characteristic of the content does not satisfy the complexity threshold, refrain from modifying, the attribute of the element to adjust the size of the portion of the content specified by the element based on the screen size of the display device. For example, content in accordance with a markup language (e.g., HTML) may have different characteristics that indicate a degree of complexity associated with the content. For instance, a HTML body size, a HTML document object model (DOM) tree node count, a HTML DOM tree node depth, and a quantity of image elements, represent various HTML characteristics that may indicate how complex the content associated with an HTML-based e-mail or webpage.

Modifications to less complex content made by data modifier module 26 may improve a user's viewing experience of content when the modified content is rendered and output for display at UID 12 while modifications to highly complex content made by data modifier module 26 may degrade user's viewing experience of content when the modified content is rendered and output for display at UID 12. Parser module 24 may determine a characteristic of the content prior to identifying one or more elements that have size related attributes and if the characteristic indicates that the content is highly complex, parser module 24 may determine that no elements have size related attributes suitable for modification by data modifier 26. For instance, parser module 24 may determine that the HTML body size of a HTML-based e-mail message exceeds a maximum body size threshold, or that the HTML document object model (DOM) tree node count of the HTML-based e-mail message exceeds a tree node count threshold, or that the HTML DOM tree node depth of the HTML-based e-mail message exceeds a node depth threshold, or that the quantity of image elements of the HTML-based e-mail message exceeds an image element quantity threshold and determine that the HTML-based e-mail message is complex and therefore cause the HTML-based e-mail message to bypass being modified by data modifier module 26 prior to being rendered by rendering generation module 28.

In some examples, computing device 10 may determine whether or not to cause data modifier module 26 to modify content, prior to causing rendering generation module 28 to render the content for display, based on how the content is classified by the computing system from which the content was received. For example, computing device 10 may receive an e-mail message comprising the content from a computing system, such as content manager module 62 of information server system 60. Computing device 10 may determine a classifier assigned by the computing system to the e-mail message. For example, content manager module 62 may parse the data of the HTML-based e-mail message and determine whether the HTML-based e-mail message is a commercial advertisement (e.g., spam) or a personal or business related message. Content manager module 62 may apply a classification to the HTML-based e-mail message indicating that the message is either promotional, or not promotions. Responsive to determining that the classifier is not indicative of promotional content, rendering engine module 22 may cause data modifier module 26 to modify, based at least in part on the screen size of the display device, the attributes of one or more identified elements to adjust the size of the portion of the content specified by the one or more elements based on the screen size of the display device. Otherwise, responsive to determining that the classifier is indicative of promotional content, rendering engine module 22 may cause data modifier module 26 to refrain from modifying the attributes of one or more identified elements to adjust the size of the portion of the content specified by the one or more elements based on the screen size of the display device.

In some examples, computing device 10 may determine whether or not to cause data modifier module 26 to modify content, prior to causing rendering generation module 28 to render the content for display, based on a sender associated with the content. For example, computing device 10 may receive an e-mail message comprising the content from a computing system, such as content manager module 62 of information server system 60. Rendering engine module 22 may determine a sender of the e-mail message, and cause data modifier module 26 to modify or not modify the size related attributes of one or more identified elements depending on the sender of the e-mail message. For instance, rendering engine module 22 may determine that the sender of the e-mail message is included in an address book of a user associated with computing device 10 and determine that the e-mail message is likely not promotional in nature and cause data modifier module 26 to modify the content of the e-mail message based on the screen size of UID 12. Rendering engine module 22 may determine that the sender of the e-mail message is associated with the sender of a promotional (e.g., spam) e-mail, and cause data modifier module 26 to refrain from modifying the content of the e-mail message based on the screen size of UID 12.

Figure 4:
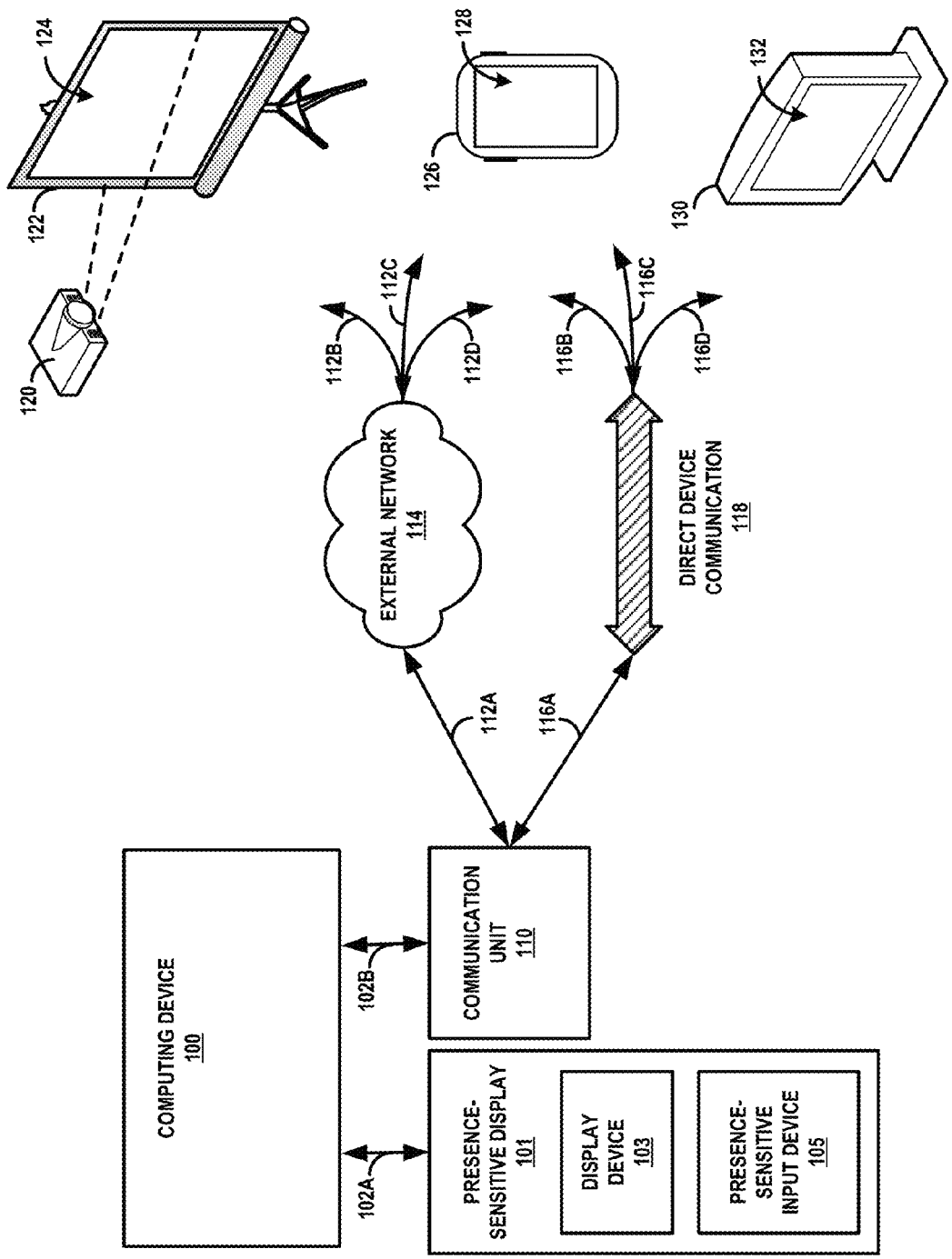
FIG. 4 is a block diagram illustrating an example computing device that outputs graphical content for display at a remote device, in accordance with one or more techniques of the present disclosure.

FIG. 4 is a block diagram illustrating an example computing device that outputs graphical content for display at a remote device, in accordance with one or more techniques of the present disclosure. Graphical content, generally, may include any visual information that may be output for display, such as text, images, a group of moving images, a rendering of content of HTML-based display data, etc. The example shown in FIG. 4 includes a computing device 100, presence-sensitive display 101, communication unit 110, projector 120, projector screen 122, mobile device 126, and visual display device 130. Although shown for purposes of example in FIGS. 1 and 2 as a stand-alone computing device 10, a computing device such as computing devices 10, 100 may, generally, be any component or system that includes a processor or other suitable computing environment for executing software instructions and, for example, need not include a presence-sensitive display.

As shown in the example of FIG. 4, computing device 100 may be a processor that includes functionality as described with respect to processors 40 in FIG. 2. In such examples, computing device 100 may be operatively coupled to presence-sensitive display 101 by a communication channel 102A, which may be a system bus or other suitable connection. Computing device 100 may also be operatively coupled to communication unit 110, further described below, by a communication channel 102B, which may also be a system bus or other suitable connection. Although shown separately as an example in FIG. 4, computing device 100 may be operatively coupled to presence-sensitive display 101 and communication unit 110 by any number of one or more communication channels.

In other examples, such as illustrated previously by computing device 10 in FIGS. 1-3, a computing device may refer to a portable or mobile device such as mobile phones (including smart phones), laptop computers, computing watches, computing eye glasses, wearable computing devices, etc. In some examples, a computing device may be a desktop computers, tablet computers, smart television platforms, cameras, personal digital assistants (PDAs), servers, mainframes, etc.

Presence-sensitive display 101 may include display device 103 and presence-sensitive input device 105. Display device 103 may, for example, receive data from computing device 100 and display the graphical content. In some examples, presence-sensitive input device 105 may determine one or more inputs (e.g., continuous gestures, multi-touch gestures, single-touch gestures, etc.) at presence-sensitive display 101 using capacitive, inductive, and/or optical recognition techniques and send indications of such input to computing device 100 using communication channel 102A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed. In other examples, presence-sensitive input device 105 may be positioned physically apart from display device 103, and locations of presence-sensitive input device 105 may correspond to locations of display device 103, such that input can be made at presence-sensitive input device 105 for interacting with graphical elements displayed at corresponding locations of display device 103.

As shown in FIG. 4, computing device 100 may also include and/or be operatively coupled with communication unit 110. Communication unit 110 may include functionality of communication unit 44 as described in FIG. 2. Examples of communication unit 110 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 100 may also include and/or be operatively coupled with one or more other devices, e.g., input devices, output devices, memory, storage devices, etc. that are not shown in FIG. 4 for purposes of brevity and illustration.

FIG. 4 also illustrates a projector 120 and projector screen 122. Other such examples of projection devices may include electronic whiteboards, holographic display devices, and any other suitable devices for displaying graphical content. Projector 120 and projector screen 122 may include one or more communication units that enable the respective devices to communicate with computing device 100. In some examples, the one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more inputs (e.g., continuous gestures, multi-touch gestures, single-touch gestures, etc.) at projector screen 122 using optical recognition or other suitable techniques and send indications of such input using one or more communication units to computing device 100. In such examples, projector screen 122 may be unnecessary, and projector 120 may project graphical content on any suitable medium and detect one or more user inputs using optical recognition or other such suitable techniques.

Projector screen 122, in some examples, may include a presence-sensitive display 124. Presence-sensitive display 124 may include a subset of functionality or all of the functionality of UID 12 as described in this disclosure. In some examples, presence-sensitive display 124 may include additional functionality. Projector screen 122 (e.g., an electronic display of computing eye glasses), may receive data from computing device 100 and display the graphical content. In some examples, presence-sensitive display 124 may determine one or more inputs (e.g., continuous gestures, multi-touch gestures, single-touch gestures, etc.) at projector screen 122 using capacitive, inductive, and/or optical recognition techniques and send indications of such input using one or more communication units to computing device 100.

FIG. 4 also illustrates mobile device 126 and visual display device 130. Mobile device 126 and visual display device 130 may each include computing and connectivity capabilities. Examples of mobile device 126 may include e-reader devices, convertible notebook devices, hybrid slate devices, computerized watches, computerized eyeglasses, etc. Examples of visual display device 130 may include other semi-stationary devices such as televisions, computer monitors, etc. As shown in FIG. 4, mobile device 126 may include a presence-sensitive display 128. Visual display device 130 may include a presence-sensitive display 132. Presence-sensitive displays 128, 132 may include a subset of functionality or all of the functionality of UID 12 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more inputs (e.g., continuous gestures, multi-touch gestures, single-touch gestures, etc.) at projector screen using capacitive, inductive, and/or optical recognition techniques and send indications of such input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, mobile device 126, and visual display device 130. For instance, computing device 100 may execute one or more instructions to generate and/or modify graphical content in accordance with techniques of the present disclosure. Computing device 100 may output the data that includes the graphical content to a communication unit of computing device 100, such as communication unit 110. Communication unit 110 may send the data to one or more of the remote devices, such as projector 120, projector screen 122, mobile device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 102A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 4 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 4. In some examples, network links 112A-112D may be Ethernet, ATM or other network connections. Such connections may be wireless and/or wired connections.

In some examples, computing device 100 may be operatively coupled to one or more of the remote devices included in FIG. 4 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, Wi-Fi, infrared, etc. One or more of the remote devices illustrated in FIG. 4 may be operatively coupled with computing device 100 by communication links 116A-116D. In some examples, communication links 112A-112D may be connections using Bluetooth, Near-Field Communication, Universal Serial Bus, infrared, etc. Such connections may be wireless and/or wired connections.

Computing device 100 may be operatively coupled to visual display device 130 using external network 114. Computing device 100 may receive content in accordance with a markup language (e.g., an HTML-based e-mail message). Computing device 100 may identify an element that specifies content in accordance with a markup language having an attribute that defines a size of at least a portion of the content specified by the element. For example, computing device 100 may parse the HTML-based e-mail for one or more image elements that have style or width attributes.

Prior to rendering the content specified by the element for display at a display device, computing device 100 may modify, based at least in part on a screen size of display device 130, the attribute of the element to adjust the size of the portion of the content specified by the element based on the screen size of visual display device 130. For example, computing device 100 may replace a fixed value assigned to a style or width attribute with a value defined in a set of presentation properties (e.g., CSS) associated with display device 130.

Computing device 100 may render, for display in accordance with the element, the content specified by each identified element. For example, computing device 100 may perform rendering operations on the modified HTML-based e-mail message (e.g., display data 30) to produce a rendering (e.g., an image file) that computing device 100 can output for display. Computing device 100 may output, for display, a graphical indication of the rendered content. For example, computing device 100 may send the rendering of the HTML-based display data to visual display device 130 over external network 114. Based on the data received over external network 114, visual display device may output for display, a graphical indication of the rendered content.

Figure 5:
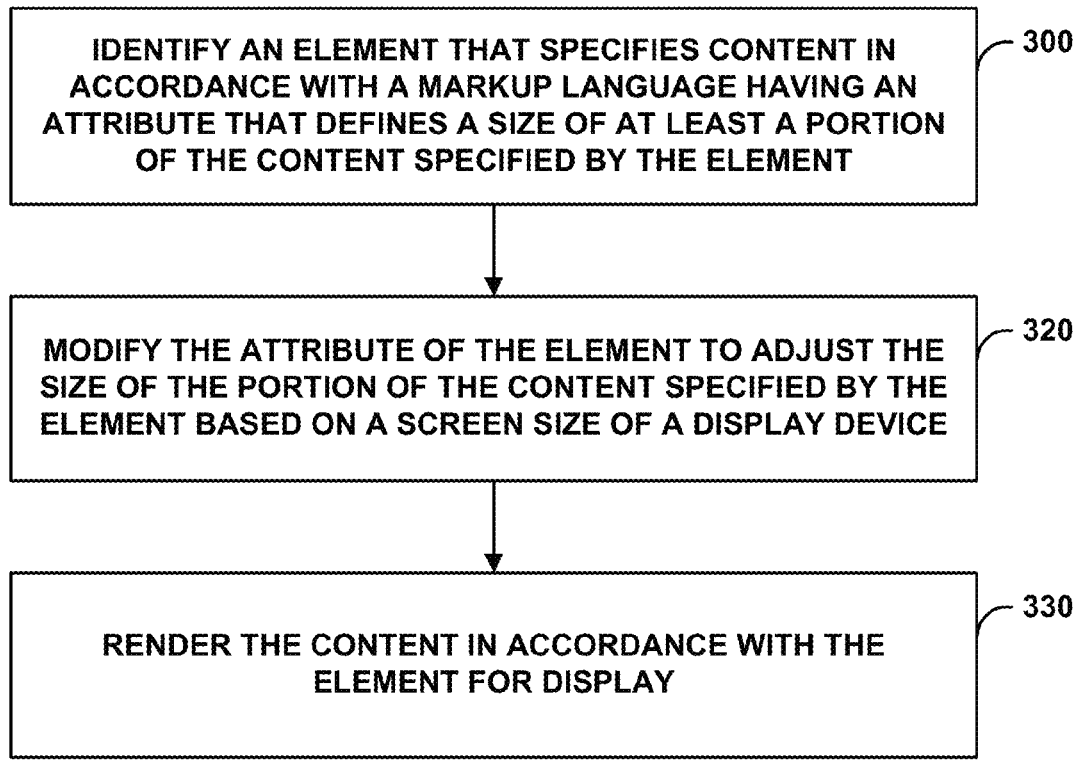
FIG. 5 is a flowchart illustrating example operations of an example computing device configured to automatically modify content prior to rendering the content for display, in accordance with one or more aspects of the present disclosure.

FIG. 5 is a flowchart illustrating example operations of an example computing device configured to automatically modify content prior to rendering the content for display, in accordance with one or more aspects of the present disclosure. The process of FIG. 5 may be performed by one or more processors of a computing device, such as computing device 10 and computing device 100 illustrated in FIG. 1, FIG. 2, FIG. 3, and FIG. 4. For purposes of illustration, FIG. 5 is described below within the context of computing devices 10 of FIG. 1.

Computing device 10 may identify an element that specifies content in accordance with a markup language and has an attribute that defines a size of at least a portion of the content specified by the element (300). For example, computing device 10 may receive an HTML-based e-mail message from content manager module 62 of information server system 60. UI module 20 may send the HTML-based e-mail message as display data 30 to rendering engine module 22. Rendering engine module 22 may invoke parser module 24 to identify one or more block elements, image elements, table elements, or table-data-field elements that have size related attributes.

Computing device 10 may modify the attribute of the element to adjust the size of the portion of the content specified by the element based on a screen size of a display device (310). For example, rendering engine module 22 may invoke data modifier module 26 to modify, based on the screen size of UID 12, the size related attributes of the one or more elements identified by parser module 24. Data modifier module 26 may, for example, replace the value assigned to a style or width attribute with a value defined by a CSS (e.g., a set of presentation properties 32) associated with UID 12.

Computing device 10 may render the content in accordance with the element for display (320). For example, rendering generation module 28 may perform HTML-based rendering techniques on the modified display data 30 to produce a rendering (e.g., an image file) of the HTML-based e-mail message. UI module 20 may cause UID 12 to output a graphical indication of the rendered content of the HTML-based e-mail for display (e.g., as page 16B of user interface 14B).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   identifying, by a computing device, an element that specifies content in accordance with a markup language, wherein an attribute of the element defines a size of at least a portion of the content specified by the element;
   prior to rendering the content specified by the element for display at a display device, modifying, by the computing device, based at least in part on a screen size of the display device, the attribute of the element to adjust the size of the portion of the content specified by the element based on the screen size of the display device;
   responsive to determining that the modification to the attribute of the element, to adjust the size of the portion of the content specified by the element based on the screen size of the display device, satisfies an improvement threshold that the computing device uses to determine whether the modification will improve the overall presentation of a rendering of the content when presented at the display device, rendering, by the computing device and for display, the content in accordance with the element;
   after outputting, for display at the display device, a graphical indication of the rendering of the content, receiving, by the computing device, an indication of a user input to change a magnification level associated with the graphical indication of the content;
   validating, by the computing device, based on the user input, the modification to the attribute of the element to adjust the size of the portion of the content specified by the element based on the screen size of the display device; and
   adjusting, by the computing device, based on the validation, the improvement threshold by at least:
      decreasing, by the computing device, the improvement threshold in response to determining the user input is a frequently provided input to increase the magnification level; and
      increasing, by the computing device, the improvement threshold in response to determining the user input is a frequently provided input to decrease the magnification level.

2. The method of claim 1, wherein modifying the attribute of the element to adjust the size of the portion of the content specified by the element comprises modifying, by the computing device, based on a set of presentation properties associated with the display device, the attribute of the element to replace an original value associated with the attribute with a new value defined by the set of presentation properties.

3. The method of claim 1, wherein the element comprises a block element in accordance with hypertext markup language, and wherein the attribute comprises a width attribute or a style attribute of the block element in accordance with hypertext markup language.

4. The method of claim 1, wherein the element comprises an image element in accordance with hypertext markup language, and wherein the attribute comprises a width attribute, a height attribute, or a style attribute of the image element in accordance with hypertext markup language.

5. The method of claim 1, wherein the element comprises a table element in accordance with hypertext markup language, and wherein the attribute comprises a width attribute or a style attribute of the table element in accordance with hypertext markup language.

6. The method of claim 1, wherein the element comprises a table-data-field element in accordance with hypertext markup language, and wherein the attribute comprises a width attribute, a style attribute, or a nowrap attribute of the table-data-field element in accordance with hypertext markup language.

7. The method of claim 1, further comprising:
receiving, by the computing device, from a computing system, the content specified by the element.

8. The method of claim 1, wherein the content is associated with an e-mail message or a webpage.

9. The method of claim 1, further comprising:
responsive determining that the content does not satisfy the improvement threshold, modifying, by the computing device, the attribute of the element to revert the modification to the attribute based on the screen size of the display device.

10. The method of claim 1, further comprising:
determining, by the computing device, that a characteristic of the content does not satisfy a complexity threshold; and
responsive to determining that the characteristic of the content does not satisfy the complexity threshold, refrain from modifying, by the computing device, the attribute of the element to adjust the size of the portion of the content specified by the element based on the screen size of the display device.

11. The method of claim 1, further comprising:
receiving, by the computing device, from a computing system, an e-mail message comprising the content;
determining, by the computing device, a classifier assigned by the computing system to the e-mail message; and
responsive to determining that the classifier is not indicative of promotional content, modifying, by the computing device, based at least in part on the screen size of the display device, the attribute of the element to adjust the size of the portion of the content specified by the element based on the screen size of the display device.

12. The method of claim 1, further comprising:
receiving, by the computing device, from a computing system, an e-mail message comprising the content;
determining, by the computing device, a sender of the e-mail message; and
modifying, by the computing device, based at least in part on the sender of the e-mail message, the attribute of the element to adjust the size of the portion of the content specified by the element based on the screen size of the display device.

13. A computing device comprising:
a display device;
at least one processor; and
at least one module operable by the at least one processor to:
identify an element that specifies content in accordance with a markup language, wherein an attribute of the element defines a size of at least a portion of the content specified by the element;
prior to rendering the content specified by the element for display at the display device, modify, based at least in part on a screen size of the display device, the attribute of the element to adjust the size of the portion of the content specified by the element based on the screen size of the display device;
responsive to determining that the modification to the attribute of the element, to adjust the size of the portion of the content specified by the element based on the screen size of the display device, satisfies an improvement threshold that the computing device uses to determine whether the modification will improve the overall presentation a rendering of the content when presented at the display device, render, for display, the content in accordance with the element;
after outputting, for display at the display device, a graphical indication of the rendering of the content, receive an indication of a user input to change a magnification level associated with the graphical indication of the content;
validate, based on the user input, the modification to the attribute of the element to adjust the size of the portion of the content specified by the element based on the screen size of the display device; and
adjust, based on the validation, the improvement threshold by at least:
decreasing the improvement threshold in response to determining the user input is a frequently provided input to increase the magnification level; and
increasing the improvement threshold in response to determining the user input is a frequently provided input to decrease the magnification level.

14. The computing device of claim 13, wherein the at least one module is further operable by the at least one processor to receive, from a computing system, the content specified by the element.

15. The computing device of claim 13, wherein the at least one module is further operable by the at least one processor to responsive determining that the content does not satisfy the improvement threshold, modify the attribute of the element to revert the modification to the attribute based on the screen size of the display device.

16. The computing device of claim 13, wherein the at least one module is operable by the at least one processor to modify the attribute of the element to adjust the size of the portion of the content specified by the element by at least modifying, based on a set of presentation properties associated with the display device, the attribute of the element to replace an original value associated with the attribute with a new value defined by the set of presentation properties.

17. A non-transitory computer-readable storage medium encoded with instructions that, when executed, cause at least one processor of a computing device to:
identify an element that specifies content in accordance with a markup language, wherein an attribute of the element defines a size of at least a portion of the content specified by the element;
prior to rendering the content specified by the element for display at a display device, modify, based at least in part on a screen size of the display device, the attribute of the element to adjust the size of the portion of the content specified by the element based on the screen size of the display device;
responsive to determining that the modification to the attribute of the element, to adjust the size of the portion of the content specified by the element based on the screen size of the display device, satisfies an improvement threshold that the computing device uses to determine whether the modification will improve the overall presentation a rendering of the content when presented at the display device, render, for display at the display device, the content in accordance with the element;
after outputting, for display at the display device, a graphical indication of the rendering of the content, receive an indication of a user input to change a magnification level associated with the graphical indication of the content;
validate, based on the user input, the modification to the attribute of the element to adjust the size of the portion of the content specified by the element based on the screen size of the display device; and
adjust, based on the validation, the improvement threshold by at least:
- decreasing the improvement threshold in response to determining the user input is a frequently provided input to increase the magnification level; and
- increasing the improvement threshold in response to determining the user input is a frequently provided input to decrease the magnification level.

* * * * *